(12) United States Patent
Rodak et al.

(10) Patent No.: US 7,781,509 B2
(45) Date of Patent: Aug. 24, 2010

(54) CLAYS PRE-ACTIVATED WITH INTERCALATED POLYMERIZATION INITIATION SITES

(75) Inventors: Nicholas J. Rodak, Princeton, NJ (US); Brian Edgecombe, Moorpark, CA (US); Noah E. Macy, Royersford, PA (US)

(73) Assignee: Arkema Inc., Philadelphia, PA (US)

( * ) Notice: Subject to any disclaimer, the term of this patent is extended or adjusted under 35 U.S.C. 154(b) by 0 days.

(21) Appl. No.: 12/252,656

(22) Filed: Oct. 16, 2008

(65) Prior Publication Data
US 2009/0048383 A1    Feb. 19, 2009

Related U.S. Application Data

(62) Division of application No. 11/081,334, filed on Mar. 16, 2005, now abandoned.

(51) Int. Cl.
*C08K 9/04*    (2006.01)

(52) U.S. Cl. ...................... 524/445; 106/416
(58) Field of Classification Search .............. 524/445; 106/416
See application file for complete search history.

(56) References Cited

U.S. PATENT DOCUMENTS

2005/0215691 A1\*    9/2005    Muhlebach et al. ......... 524/445

\* cited by examiner

*Primary Examiner*—Robert D. Harlan
(74) *Attorney, Agent, or Firm*—Steven D. Boyd

(57) ABSTRACT

A modified clay may be made by contacting a clay with an unsaturated cationic compound and an alkoxyamine, or an adduct thereof. The resulting pre-activated clay, which contains a cationic alkoxyamine bound to the clay, may be further treated with a monomer to provide a polymer that is bound to the clay, thereby forming a nanocomposite material. The nanocomposite material may in turn be blended with another polymer prepared from the same or a different monomer.

13 Claims, 6 Drawing Sheets

CLAYS PRE-ACTIVATED WITH INTERCALATED POLYMERIZATION INITIATION SITES

This application is a divisional of U.S. application Ser. No. 11/081,334 filed Mar. 16, 2005

FIELD OF THE INVENTION

The invention relates to clays for use as fillers in composite materials. More particularly, it relates to clays that are organically modified to enhance their incorporation into such composite materials.

BACKGROUND OF THE INVENTION

Composite materials can include a filler dispersed in a polymer matrix. The filler, especially if it is an inorganic one such as clay, can contribute to the mechanical properties of the composite, such as stiffness. In traditional composites, certain other properties, such as impact resistance, may suffer as a result of incorporation of the filler. More recently, a new class of composite materials, known as nanocomposites, has received considerable attention. Unlike conventional composites, which tend to lose impact strength with increasing filler levels, nanocomposites generally retain high levels of impact strength while enhancing the thermal, physical, and mechanical properties of the composite relative to that of the parent polymer alone. In nanocomposites, these material property enhancements are frequently observed at much lower inorganic loading levels than are normally used for conventional fillers. Industrially useful polymers whose properties may be enhanced through nanocomposite formation include poly(meth)acrylates, polystyrenes, polyolefins, nylons, polyesters, polycarbonates, (block) copolymers containing these units, and fluoropolymers such as polytetrafluoroethylene, polyvinylidene fluoride, etc.

Commonly used fillers for making nanocomposites include clays such as montmorillonite, bentonite, laponite, and other mica-type aluminosilicates. The desirable properties of clay-containing nanocomposites may be due, at least partly, to intimate interactions between the host polymer and the interstitial galleries of the clay, especially when the latter has been rendered more organophilic via cation exchange reactions with organic cations.

Nanocomposites can be prepared either by in situ polymerization (solution, emulsion, batch, bulk, etc.), melt intercalation, solution casting, or other techniques. During these processes, wetting of the surface of the clay with the polymer may be enhanced by the presence of the organic cationic modifiers, which are intercalated into the clay galleries. This cation intercalation facilitates parent polymer intercalation into the interstitial spaces between the clay layers, thus aiding clay platelet exfoliation. The optimal cation for facilitating this process depends upon a number of factors, including the type of polymer(s) to be incorporated in the composite, stability during material processing, and desired nanocomposite material properties, and therefore it is desirable to be able to provide intercalating cations that are functionalized with any of a variety of organic groups, typically some fraction of cation modifiers, whether a small (monomeric) or large (oligo- or polymeric) cationic molecule that are of a similar composition to that of the polymers that will be mixed with the clay to form the nanocomposite. However, this cation modifier compositional characteristic does not preclude other potential characteristics one skilled in the art may use such as polar and non polar, van der Waal's, or covalent interactions to impart and enhance desirable end material properties.

SUMMARY OF THE INVENTION

In one aspect, the invention provides a composition including a clay having layers and exchangeable sites and, disposed between the layers, a cationic alkoxyamine according to formula I.

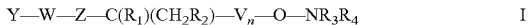

$$Y-W-Z-C(R_1)(CH_2R_2)-V_n-O-NR_3R_4 \qquad I$$

In formula I, Y is a heterocyclic quaternary ammonium moiety, $^+NX_1X_2X_3$, or $^+PX_1X_2X_3$ wherein $X_1$, $X_2$ and $X_3$ are each individually H or a C1-C20 group selected from the group consisting of alkyl, aryl, arylalkyl, alkylaryl, and any of these substituted with one or more of oxygen, nitrogen, sulfur, and phosphorus; W is a direct bond or a C1-C20 alkyl, aryl, arylalkyl, or alkylaryl spacer group; Z is selected from O, NH, O—CO, NH—CO, and phenylene; V is a vinylic monomer repeating unit; n is an integer from 0 to 100,000; $R_1$ and $R_2$ are as defined for $X_1$, $X_2$, and $X_3$; and $R_3$ and $R_4$ are each individually selected from C1-C10 alkyl or together form part of an unsubstituted or alkyl-substituted piperidine or pyrrolidine ring, provided that at least one of $R_3$ and $R_4$ is substituted alpha to N with $PO(OR_7)_2$, wherein each $R_7$ is individually selected from the group consisting of H, lower alkyl, aryl, arylalkyl, and alkylaryl.

In another aspect, the invention provides a method for making a modified clay. The method includes performing in any sequence the steps of:

a) contacting a clay with a compound according to formula III:

$$Y-W-Z-C(R_1)=CH_2 \qquad III; \text{ and}$$

b) contacting the clay with an alkoxyamine according to formula IV:

$$R_2-O-NR_3R_4 \qquad IV;$$

In formulae III and IV, Y, W, Z, and $R_1$-$R_4$ are as defined immediately above.

DETAILED DESCRIPTION OF THE INVENTION

The invention provides modified clays, methods for making them, and methods of using them to make nanocomposite materials. The clays are modified with a cationic alkoxyamine, which by replacing alkali metal cations in it, may intercalate or even exfoliate the clay. The cationic alkoxyamine may be monomeric, being an adduct of a nitroxide source (typically a neutral alkoxyamine) with an unsaturated cationic compound. The term "pre-activated clay" as used herein means a clay containing such a compound. The cationic alkoxyamine may also be polymeric, being the reaction product of such a monomeric adduct on a pre-activated clay with one or more vinylic monomers to provide a cation-terminated or functionalized oligomer or polymer. Without wishing to be bound by any particular theory or explanation, it is believed that the cationic end of such a polymer becomes anchored to the surface of the clay, with the polymer chain providing a site for compatibilizing association with additional bulk polymer not bearing the cationic group, in which the clay is dispersed to form the nanocomposite.

Figure 1A:
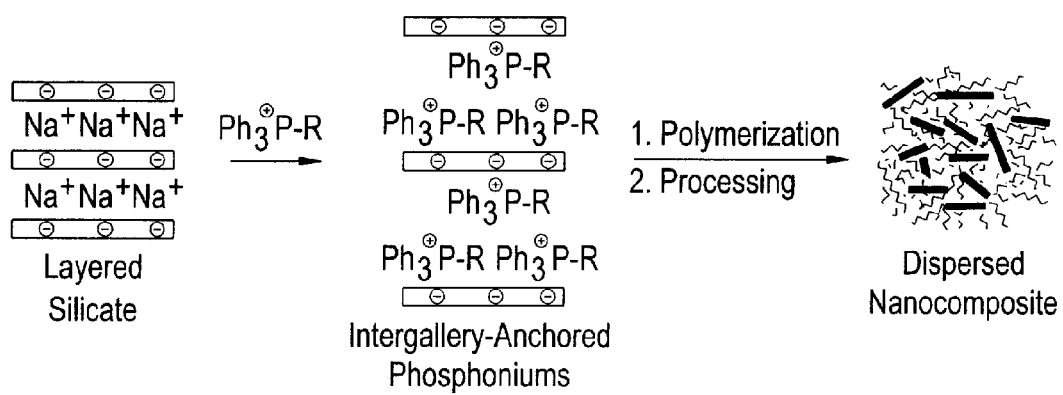
FIG. 1A shows a postulated microscopic structure of a composition according to the invention.
Figure 1B:
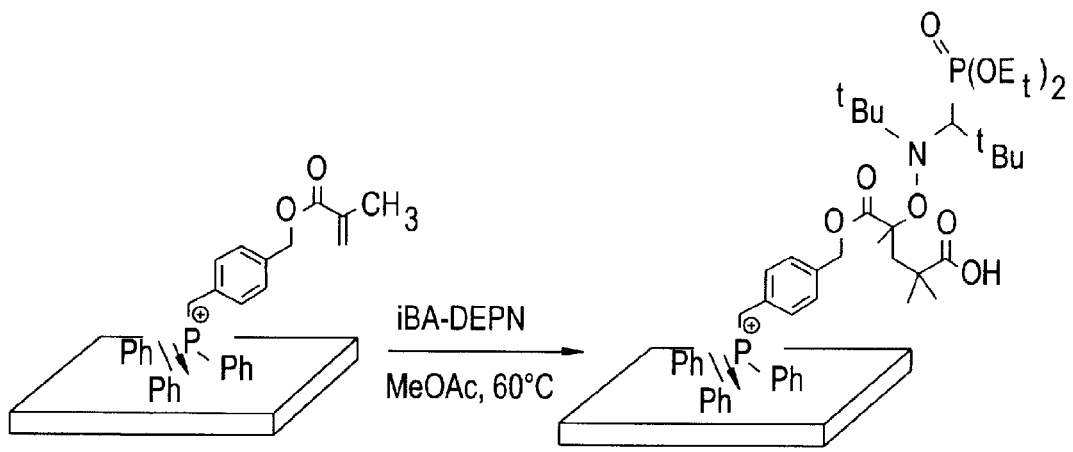
FIG. 1B shows the conversion of an unsaturated cationic compound to a cationic alkoxyamine, according to the invention.

FIG. 1A is a hypothetical illustration of how cations, in this case phosphonium cations, may intercalate into clays to provide anchored sites for compatibilizing added polymers (shown as zigzag lines) to form polymer/clay nanocomposites. In FIG. 1A, at least some of the $Ph_3P^+$—R is a monomeric or polymeric cationic alkoxyamine, or a mixture of these. If the cationic alkoxyamine is polymeric, the polymer may be formed by any of a number of methods known in the art, including emulsion, solution, or bulk polymerization. FIG. 1B illustrates how an exemplary intercalated cationic alkoxyamine may be prepared on the surface of a clay layer, by interaction of an unsaturated, intercalated cationic compound with a neutral alkoxyamine. Under these conditions, at least some of the cationic alkoxyamine is disposed in some specific way determined by the reactive phosphonium modifier between the layers or platelets of the clay. Exposure of the alkoxyamine-reacted, pre-activated cationic clay modifier to reactive vinylic monomers such as those shown below in relation to formula II results, under typical polymerization conditions, in intercalation or exfoliation of the clay, or both.

The modified clay may further contain cationic diluents that are not adductible with nitroxide sources or vinylic monomers, but which aid in intercalating or exfoliating the clay by replacing alkali metal cations at exchangeable sites. The percentage of exchangeable sites occupied by the cationic alkoxyamine (and optionally the cationic diluent) may vary between 1 and 100%, with the preferred composition depending on a number of factors such as the exact structure of the cation(s), the type of clay, the type of polymer with which the modified clay is to be made compatible, and the end-use application of the resulting nanocomposite material. Typically, at least 25%, more typically at least 50% of the exchangeable sites on the clay will be associated with a cationic alkoxyamine and/or a cationic diluent, while in some embodiments the amount is at least 75%. However, there are no known limits or constraints on the actual amount of alkoxyamine incorporated through the means indicated here. Of the combined loading of cationic alkoxyamine and optional cationic diluent, typically at least 1 mol %, more typically at least 25 mol %, and most typically at least 50 mol % is the cationic alkoxyamine. In most cases at least 25% of exchangeable sites are associated with the cationic alkoxyamine.

The modified clays of this invention may also contain bulk polymers, thereby providing nanocomposite materials. Such materials may be made by polymerizing a vinylic monomer in the presence of a clay that has been intercalated or exfoliated with a cationic alkoxyamine according to the invention, and optionally by blending the product of such a reaction with a bulk polymer from another source and/or of another chemical composition, which polymer may or may not containing cationic groups derived from an analogous tethered, cationic alkoxyamine system. Nanocomposite materials prepared in any of these ways typically exhibit excellent physical and thermal performance properties. Detailed descriptions of the components and methods for making modified clays and nanocomposites according to the invention will now be provided.

Clay

Clays suitable for use according to the invention include naturally-occurring and synthetic clays. Suitable examples include natural and synthetic smectite, phyllosilicate, montmorillonite (MMT), bentonite, laponite, saponite, beidellite, montronite, hectorite, fluohectorite, stevensite, vermiculite, kaolinite, hallosite, mica, and or double-layered hydroxides. Of these, montmorillonite will typically be selected, due to its ready availability. Usually the clay is chosen based on its aspect ratio, trace metal profile, cation exchange capacity, ease of acquisition, color or purity, or swellability, depending upon the desired end use of the nanocomposite material.

Cationic Alkoxyamine

The modified clays of this invention have layers and exchangeable sites and, disposed between the layers, a cationic alkoxyamine according to formula I:

$$Y-W-Z-C(R_1)(CH_2R_2)-V_n-O-NR_3R_4 \qquad I.$$

The compounds of formula I may be prepared by any method, including in situ formation in the presence of clay by methods that are discussed below under Modified Clay Preparation. In formula I, Y may be a heterocyclic quaternary ammonium moiety, $^+NX_1X_2X_3$, or $^+PX_1X_2X_3$, wherein $X_1$, $X_2$, and $X_3$ are each individually H or a C1-C20 group selected from alkyl, aryl, arylalkyl, alkylaryl, and any of these substituted with one or more of oxygen, nitrogen, sulfur, and phosphorus. W is a direct bond or a C1-C20 alkyl, aryl, arylalkyl, or alkylaryl spacer group; Z is selected from O, NH, O—CO, NH—CO, and phenylene; V is a vinylic monomer repeating unit; n is an integer; $R_1$ and $R_2$ are as defined for $X_1$, $X_2$, and $X_3$; and $R_3$ and $R_4$ are each individually selected from C1-C10 alkyl or together form part of an unsubstituted or alkyl-substituted piperidine or pyrrolidine ring, provided that at least one of $R_3$ and $R_4$ is substituted alpha to N with $PO(OR_7)_2$, wherein each $R_7$ is individually selected from the group consisting of H, lower alkyl, aryl, arylalkyl, and alkylaryl. The value of n may be zero, or it may be from 1 to 100,000. Typically, n will be between 1 and 10,000. In some embodiments, it is between 1 and 50. The specific value of n may be determined by the properties of the cationically swelled clays in the actual polymerization medium and/or by the desired material properties for a given end-use application. In some embodiments of the invention, $R_2$ is $C(R_8)_2$—COOH, $C(R_8)_2$—COO— (lower alkyl, aryl, arylalkyl, or alkylaryl), or $C(R_8)_2$—CON-(lower alkyl, aryl, arylalkyl, or alkylaryl)$_2$ wherein $R_8$ is H or a lower alkyl group.

As used herein, the term "alkyl" refers to linear or branched saturated hydrocarbon substituents having from one to about twenty carbon atoms or, preferably, one to about twelve carbon atoms. Examples of such substituents include methyl, ethyl, n-propyl, 2-propyl, n-butyl, iso-butyl, sec-butyl, tert-butyl, pentyl, iso-amyl, and hexyl. The term "lower alkyl" means methyl, ethyl, 1-propyl, 2-propyl, 1-butyl, 2-butyl, iso-butyl, and tert-butyl. Alkyl substituents may themselves be substituted with one or more substituents, such as alkoxy, hydroxyl, amino, halo, nitro, acyl, cyano, carboxy, or thioalkyl, for example. Unless otherwise specified, the term "alkyl substituted" or its equivalent includes substitution by one or more alkyl groups.

The term "aryl" refers to a carbocyclic aromatic system containing one or more rings, which may be attached together in a pendent manner or may be fused, such as phenyl, naphthyl, tetrahydronaphthyl, indane and biphenyl. Aryl substituents may also be substituted with one or more substituents, such as alkyl, haloalkyl, alkoxy, hydroxyl, amino, halo, nitro, alkylamino, acyl, cyano, carboxy, thioalkyl, alkoxycarbonyl, for example. An alkyl substituent that in turn comprises an aryl substituent at a substitutable position is referred to herein as "arylalkyl", with nonlimiting examples being benzyl, diphenylmethyl, triphenylmethyl, phenylethyl, and diphenylethyl. Conversely, an aryl substituent that in turn comprises an alkyl substituent at a substitutable position is referred to herein as "alkylaryl". Exemplary alkylaryl radicals are tolyl, xylyl, ethylphenyl, and the like.

Heterocyclic quaternary ammonium moieties suitable for use as the Y group in formula I include, for example, imidazolium and triazolium cations and substituted derivatives thereof. Substitution of the imidazolium or triazolium group may be with any of a variety of alkyl, aryl, arylalkyl, or alkylaryl groups, and/or substitution may be in the form of one or more fused rings. Examples include substituted or unsubstituted benzimidazoles. Oxazolium and substituted oxazolium cations may also be used for the Y group.

The Y group may also be an organic ammonium or phosphonium group. Phosphoniums bearing from 1 to 4 aryl substituents are especially useful. In some preferred embodiments, the W group is aryl or benzyl. In some embodiments of the invention, $X_1$, $X_2$, and $X_3$ are each individually C5-C10 aryl, C5-C10 heteroaryl, or lower alkyl substituted with C5-C10 aryl or C5-C10 heteroaryl. In certain preferred embodiments, each of $X_1$, $X_2$, and $X_3$ is phenyl.

The Y group typically includes one or more aromatic or heteroaromatic groups, to facilitate exfoliation of the clay in the polymer matrix. One or more of these groups may be substituted with alkyl, perfluoroalkyl, polar, hydrocarbon, or aromatic moieties. Such substitution may be selected to provide or enhance entropic, ionic, covalent, dipole, and/or hydrogen bonding interactions between either the clay and the cationic alkoxyamine, or between the modifier and the parent polymer in the exfoliation process.

In picking the cationic group Y, consideration should be given to the fact that temperatures required to achieve thorough mixing and complete exfoliation of the clay during processing, i.e. melt-blending, often lie above the threshold of intercalated ammonium cation thermal stability (about 170-180° C.). Thus ammonium cations may decompose to at least some extent under these conditions, frequently with concomitant discoloring. In some cases, this may be undesirable. In such situations, analogous organophosphonium cations may be preferable. These effectively alter clay surface properties but typically possess much higher thermal stabilities (up to 370-400° C.) than their ammonium counterparts. Aromatic-substituted phosphonium ions are particularly useful. Additionally, the propensity of phosphonium cations to cation exchange into the interstitial spaces of clays is often related to their aromatic content, with phosphonium ions having a greater number of aromatic substituents tending to wet the clay better than those with fewer. Aryl phosphonium cations also reduce the amount of residual, interstitial water that, upon nanocomposite formation, may accelerate parent polymer degradation via hydrolysis, etc. Further, substitution of the aromatic rings with appropriate functionality may improve clay particle exfoliation in the parent polymer matrix through polar, ionic, covalent, or other interactions.

In terms of the overall structure of the cationic alkoxyamine, that portion indicated by the segment W—Z—C($R_1$)(CH$_2R_2$) in formula I may be any combination of W, Z, $R_1$ and $R_2$ described above. Typically, $R_1$ will be methyl or H. The combination of W and Z will typically be CH$_2$-φ-CH$_2$—OCO, CH$_2$-φ, φ-CH$_2$—OCO, or φ, where φ represents phenylene. $R_2$ will typically be an optionally substituted tertiary alkyl group, and more typically a tertiary alkyl group with a carbonyl carbon or a phenyl carbon bonded to the tertiary carbon. Suitable nonlimiting examples of $R_2$ include C(CH$_3$)$_2$COOH and C(CH$_3$)$_2$C$_6$H$_5$.

Vinylic Monomer

The polymerization of any vinylic monomer may be effected by use of anchored cationic alkoxyamines to form a cationically terminated polymer, with the monomer providing the repeating unit V in formula I. Nonlimiting examples of suitable vinylic monomers include acrylic acid, methacrylic acid, acrylate esters, methacrylate esters such as methyl methacrylate, acrylic amides such as acrylamide, methacrylic amides such as methacrylamide, acrylonitrile, styrene, substituted styrenes, vinyl acetate, enol ethers, vinyl chloride, vinylidene chloride, vinyl fluoride, and vinylidene fluoride. Also suitable are styrene, α-methylstyrene, p-methylstyrene, divinylbenzene, and monomers according to formula II:

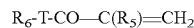    II;

wherein $R_5$ is H, lower alkyl, or aryl; $R_6$ is H, lower alkyl, aryl, or perfluoroalkyl; and T is O, NH, or S. Typically, the vinylic monomer repeating unit V as shown in formula I above for the cationic alkoxyamine will be chosen for compatibility with the bulk polymer, although this need not be the case. If the repeating unit V is chosen for compatibility, it may be a repeating unit that is found in the bulk polymer, or it may be one that is not found there. It may be provided by a single monomer, or by a mixture of monomers.

Cationic Diluent

The modified clay may also include, in addition to the cationic alkoxyamine, a cationic diluent. Such a diluent may be used to exchange some fraction of the alkali metal cations in the clay, thereby increasing the extent of intercalation, tailoring of the clay platelet surface functionality, swelling, and degree of platelet exfoliation. Suitable cationic diluents include any of a variety of ammonium or phosphonium compounds bearing alkyl, aryl, arylalkyl, or alkylaryl groups, or combinations of these, or heteroatom-containing oligomeric materials such as oligo(oxyalkylenes) or their polymeric analogs. In general, cationic diluents may be compounds of the formula Y—$R_1$, where Y and $R_1$ are as defined above. One suitable cationic diluent is stearyltriphenylphosphonium bromide. Other suitable cationic diluents cover a broad range, and include quaternary ammonium or phosphonium cations having aryl and/or alkyl substituents, with such substituents typically having from one to 20 carbon atoms each.

Bulk Polymer

Bulk polymers suitable for blending with the modified clays of this invention to provide nanocomposite materials include any that are used in the composite polymer art, for example thermoplastics, engineering resins, fluoropolymers, and/or their random, alternating, or block copolymers. Suitable non-limiting examples include poly(meth)acrylates, polystyrenes, polyolefins, polyamides, polyesters, polycarbonates, their (block) copolymers, and fluoropolymers such as polytetrafluoroethylene, polyvinylidene fluoride, etc. Polyvinyl chloride, chlorinated polyvinyl chloride, and polyurethanes are other examples.

Modified Clay Preparation

Modification of the clay may be achieved by performing in any sequence the steps of:

a) contacting a clay with an unsaturated cationic compound according to formula III:

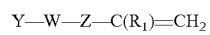    III; and b) contacting the clay with an alkoxyamine according to formula IV:

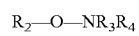    IV.

Groups Y, W, Z, $R_2$, $R_3$, and $R_4$ are as defined above in relation to the cationic alkoxyamine according to formula I.

In some embodiments of the invention, the alkoxyamine IV is one which produces the N-tert-butyl-N-[1-diethylphosphono-(2,2-dimethylpropyl)] nitroxide (DEPN) radical. One particularly effective class of nitroxide sources includes compounds such as iBA-DEPN, shown below, where the DEPN radical is linked to an isobutyric acid radical or an ester or amide thereof. If esters or amides are used, they are preferably derived from lower alkyl alcohols or amines, respectively.

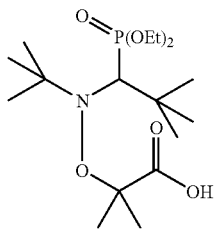

This nitroxide source may be of particular use in cases where a low temperature of activation for initiation of polymerization is desired, for instance where the vinylic monomer is a methacrylate, such as methyl methacrylate.

There is a temperature-dependent equilibrium between an alkoxyamine and a corresponding nitroxide/alkyl radical pair, and thus the compound according to formula IV is able to add by free radical addition to the carbon-carbon double bond of III to form an adduct, namely a cationic alkoxyamine. This adduct is in turn capable of forming a radical pair, and thus may be used to initiate polymerization of a vinylic monomer. This may proceed as soon as the cationic alkoxyamine is formed, if formation is performed in the presence of a vinylic monomer. If a sufficient amount of monomer is present, polymerization may proceed directly to the desired molecular weight. Alternatively, the formation may be performed in the presence of a smaller amount of monomer, thereby favoring the formation of cationic alkoxyamines incorporating only one or a few monomer units, and the modified clay thus prepared may be stored until ready for further monomer addition and polymerization. As a third alternative, no monomer at all may be present when the cationic alkoxyamine is formed, and monomer may be added later, at which point polymerization can begin. In all of these cases, some fraction of the polymer chains are initiated by the cationic alkoxyamine adduct, such that one end of the resulting polymer chain bears a cationic group derived from the unsaturated cationic compound of formula III. The degree of surface functionalization is often at least partially determined by the initiation efficiency of the cationic alkoxyamine and by (co) monomer polymerizability or reactivity, but other factors may also contribute to the overall initiation efficiency of thus intercalated cationic alkoxyamines. Improved composite properties are typically achieved in this way. Without wishing to be bound by any particular theory or explanation, this improvement is believed to result at least partially from tethering of polymer chains to the clay, resulting in a stronger association between the polymer and the clay.

The steps of a). contacting the clay with a cationic monomer and b). contacting it with the alkoxyamine may be performed in any sequence or simultaneously, according to the invention. Similarly, if a free monomer is added, it may be done at any time. Steps a) and b) may both be performed in the absence of vinylic monomer, or in the presence thereof. A solvent may also be present during the preparation of the modified clay.

In some embodiments of the invention, the clay is contacted and intercalated with a pre-formed adduct of an unsaturated cationic compound and an alkoxyamine, thereby intercalating the clay with a cationic alkoxyamine. Typically, however, the clay will be first contacted and thereby intercalated with the unsaturated cationic compound to provide a clay to which is bound an unsaturated site, the alkoxyamine will then be added to convert the bound intercalated unsaturated site to a bound cationic alkoxyamine, and the free monomer will then be added to form polymer. In some embodiments, this latter stepwise approach to preparing the cationic alkoxyamine in situ in contact with the clay may provide the advantage that the cationic alkoxyamine groups may, by virtue of being anchored to the clay, be immobilized and hence stabilized against decomposition or disproportionation. This may improve the yield of active species present for initiating polymerization of the vinylic monomer, resulting in a greater proportion of polymer chains being tethered to the clay surface, and may be of particular benefit in cases where methacrylate monomers are used. Increasing the amount of tethering typically results in improvements in nanocomposite properties. In some embodiments of the invention, polymerization may be aided by the use of typical radical initiators along with the tethered cationic alkoxyamines.

Nanocomposite Preparation

Nanocomposite materials may be prepared directly according to the invention by polymerizing any of the vinylic monomers described above in the presence of a pre-activated clay. Such a clay/polymer composite material may in turn be blended with a bulk polymer, copolymer (random, alternating, or block) or mixture of homopolymers of different identity and physical properties such as molecular weight. The bulk polymer may or may not be of the same composition as that prepared during the polymerization initiated by the cationic alkoxyamine. Blending may be performed by any means known in the art, including as nonlimiting examples melt processing such as by twin screw extrusion, or solution casting. The wt % loading of clay (calculated without the modifier) in nanocomposites according to the invention may vary over a wide range, and will depend inter alia upon the type of clay, the cation exchange capacity of the clay, the composition of the cationic alkoxyamine and diluent modifiers, the type and composition of polymer in which the clay is dispersed, and the application for which the resulting nanocomposite will be used. Typically, the clay loading will be between 0.1 and 75 wt %, more typically between 1 and 45 wt %.

EXAMPLES

Example 1

Table 1 shows thermogravimetric analysis (TGA) and X-ray diffraction (XRD) data that were obtained for montmorillonite (MMT) clays intercalated with various cations. Sample 1 was unmodified, pristine MMT clay. XRD data, given in angstroms (Å), is the distance d, i.e. d-spacing, between the individual clay platelets or layers. A higher number indicates increased intercalation and separation of the clay platelets.

TABLE 1

Thermal Degradation of Cation-Exchanged Montmorillonite Clays at 800° C.

| Sample | Exchanged Cation | % Residue (air/$N_2$) | % Mass Loss (air/$N_2$) | XRD |
|---|---|---|---|---|
| 1 | None | 86.6/85.9 | 13.4/14.1 | 12.43 |
| 2 | $Bu_4N^+$ | 86.6/86.1 | 13.4/13.9 | 12.98 |
| 3 | $Bu_4P^+$ | 82.5/79.4 | 17.5/20.6 | 9.88 |
| 4 | $Ph_3P^+(Bu)$* | 68.9/66.9 | 31.1/33.1 | 19.31 |
| 5 | $Ph_3P^+(Ph)$* | 68.8/69.3 | 31.2/30.7 | 18.32 |
| 6 | $Ph_3P^+(Bz)$* | 70.7/71.8 | 29.5/28.2 | 17.54 |

*Bu is butyl, Ph is phenyl, and Bz is benzyl. Samples 2-6 were 75% cation-exchanged, based on a calculated 146 meq/100 g clay.

As can be seen from Table 1, phosphonium cations bearing at least three phenyl groups were particularly effective at intercalating the clay, as indicated by higher d-spacing numbers.

Table 2 shows the results of thermal degradation experiments that were performed on clays that were intercalated with the indicated mole equivalents of $Ph_3P^+(Ph)$, relative to a calculated 146 meq/g of clay.

TABLE 2

Thermal Degradation of $Ph_3P^+$ (Ph)-Substituted Montmorillonite Clays vs. Temperature

| Sample | Equivalents | % Residue (100° C.) | % Residue (200° C.) | % Residue (800° C.) | XRD |
|---|---|---|---|---|---|
| 1 | 0.0 | 91.5 (8.5) | 91.1 (8.9) | 86.6 (13.4) | 12.43 |
| 2 | 0.5 | 95.4 (4.6) | 94.9 (5.1) | 73.1 (26.8) | 17.93 |
| 3 | 1.0 | 97.2 (2.8) | 96.5 (3.5) | 68.8 (31.2) | 18.32 |
| 4 | 2.0 | | | | 18.18 |
| 5 | 3.0 | | | | 18.22 |

The results shown in Table 2 indicate that aryl containing phosphonium modifiers were particularly effective at intercalation, since no further d-spacing increase was observed above 1 mole equivalent of phosphonium cations to exchangeable inorganic cations, and that such modified clays were significantly less hygroscopic than non-intercalated clays, as evidenced by decreasing mass loss below 100° C. with increasing weight percent intercalated phosphonium cation.

Typically, phosphonium cations also possess a higher propensity for intercalation than their ammonium analogs, as seen by the XRD data in Tables 1 and 2, where higher numbers indicate higher intercalation and greater potential for exfoliation of the clay layers for an equivalent carbon chain length, or for an equivalent total atom content.

Figure 3:
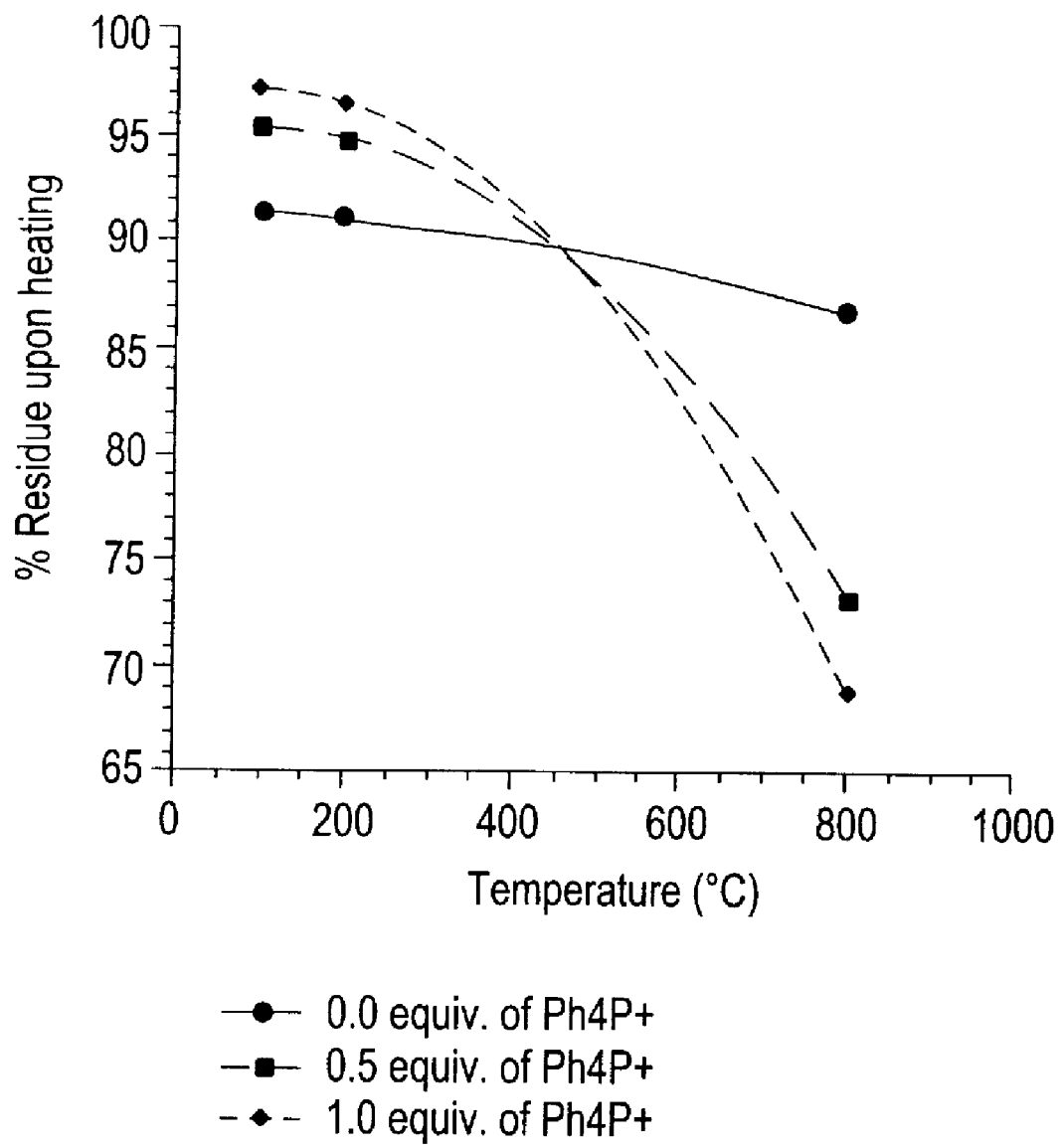
FIG. 3 is a plot of thermogravimetric analysis data for clays modified with three levels of tetraphenylphosphonium $Ph_4P^+$ cation.

Peraryl, for example perphenyl, substituted cationic modifiers, especially phosphonium compounds, possess a high propensity for intercalation into the phyllosilicate (clay) interstitial galleries (Table 1, XRD data) as well as good thermal stability. Selected data from Table 1 are plotted in FIG. 3. As seen there, incorporation of phenylated onium modifiers also significantly reduced water uptake by modified clays, as indicated by the higher % Residue values (i.e., lower amounts of water lost during heating) at temperatures of 200° C. or less. Alkyl substituted onium (ammonium) cations, more commonly prescribed in the art, are more hygroscopic. This may be due their higher charge density, but in any case they are reported by some workers to be less desirable for polymer matrix materials that possess water-sensitive groups such as esters or amides. Ammonium cations also typically suffer from degradative processes (e.g. Hoffman elimination) at elevated processing temperatures. Analogous degradative processes to produce deleterious side products do not occur with aryl, alkyl, or arylalkyl phosphonium substituted modifiers. The data of FIG. 3 also indicate that intercalation of aryl containing phosphonium cation modifiers appears to favor exclusion of trace, physiadsorbed water, in view of the lower wt % loss (due to lower water content) at low temperatures (e.g. 100-200° C.) with increasing modifier loading.

Similarly, as shown in FIG. 2, phosphonium-modified MMT clays had increased thermal stability when they contained aryl (trace B) vs. alkyl (trace A) substituents. For example, trace B (tetraphenyl) shows an apparent decomposition onset >375° C., while trace A (tetrabutyl) shows significant decomposition around 300° C. Also, aryl substitution appears to favor or facilitate organic phosphonium cation intercalation compared with alkyl substitution, as indicated by the smaller loss of mass at low temperatures for the tetraphenyl phosphonium.

Figure 4:
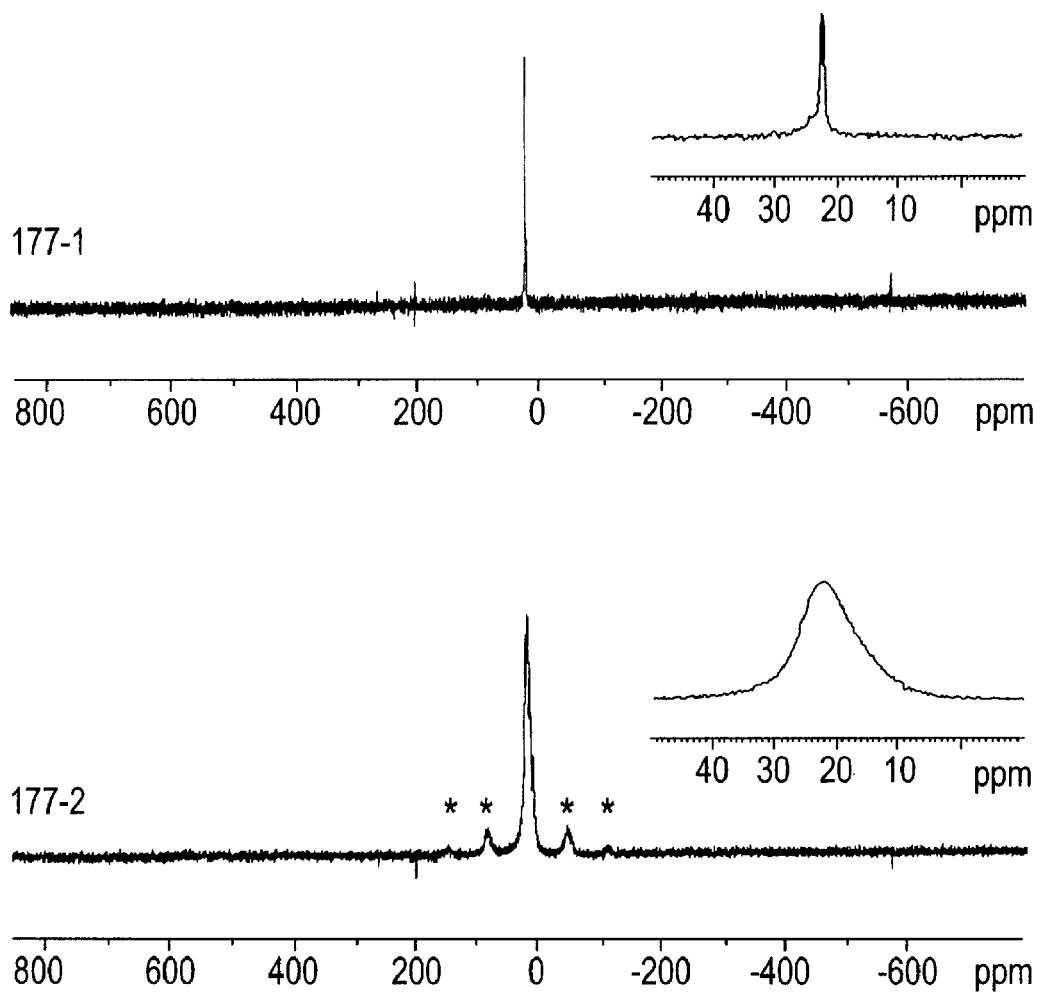
FIG. 4 shows $^{31}P$ NMR analyses of a [4-(methacrylmethyl)benzyl]triphenylphosphonium cation, in the form of its bromide salt (Sample 177-1), and of a montmorillonite clay intercalated with that cation (Sample 177-2).

FIG. 4 shows Solid State $^{31}P$ NMR analyses of Cation 2, [4-(methacrylmethyl)benzyl]triphenylphosphonium, in the form of its bromide salt (Sample 177-1), and of an MMT clay intercalated with Cation 2 (Sample 177-2). In Sample 177-2, the MMT clay was 100% exchanged with the [4-(methacrylmethyl)benzyl]triphenylphosphonium cation only (no other phosphonium cations were used). The insets in FIG. 4 for each sample reveal a conservation of chemical shift for the phosphonium cation irrespective of the counter anion, whether bromide (177-1) or a polyanion such as the MMT clay (177-2), after employing the described aqueous cation exchange procedures.

Example 2

Montmorillonite-PGV clay (Sample 1) was intercalated with a 1:1 mole ratio mixture of the stearyltriphenylphosphonium (diluent Cation 1) and [4-(methacrylmethyl)benzyl]triphenylphosphonium (unsaturated Cation 2) cations, provided as the bromide salts, to form phosphonium-modified precursor clays (Samples 2 and 4). A total of 75%-100% of the intercalated inorganic cations were exchanged with the phosphonium cation composition. The precursor clays were then treated with iBA-DEPN to form pre-activated clays (Samples 3 and 5). XRD and TGA analyses of these samples were performed, yielding the results shown in Table 3.

TABLE 3

Physical and Thermal Characterization of Phosphonium-MMT Intercalated Clays

| Sample | Clay | % Cation Exchange[1] | Exchanged Cations | Mode | XRD d-spacing (Å) | TGA[2] Wt % $Org_{Exp.}$ | TGA Wt % $Org_{Theory}$ |
|---|---|---|---|---|---|---|---|
| 1 | MMT-PGV | 0 | NA | Virgin clay | 12.43 | 13.4 | — |
| 2 | MMT-PGV | 75 | 1 + 2 | Precursor[3] | 18.30 | 31.5 | 34.8 |
| 3 | MMT-PGV | 75 | 1 + 2 | Pre-activated | 32.51, 18.43 | 40.1 | 40.3[4] |
| 4 | MMT-PGV | 100 | 1 + 2 | Precursor | 18.55 | 39.37 | 42.20 |
| 5 | MMT-PGV | 100 | 1 + 2 | Pre-activated | 43.51, 18.91 | 51.86 | 50.43 |

Note:
[1] Based on the theoretical cationic exchange capacity of 147 meq./100 g for Montmorillonite PGV clay, available from Nanocor of Arlington Heights, IL.
[2] TGA analysis ramped at 10° C./min. from ambient to 800° C. in $N_2$.
[3] Clay was intercalated with phosphonium cations 1 and 2, but not reacted with iBA-DEPN.
[4] Quantitative reaction of iBA-DEPN with phosphonium cation 2 is assumed.

Figure 2A:
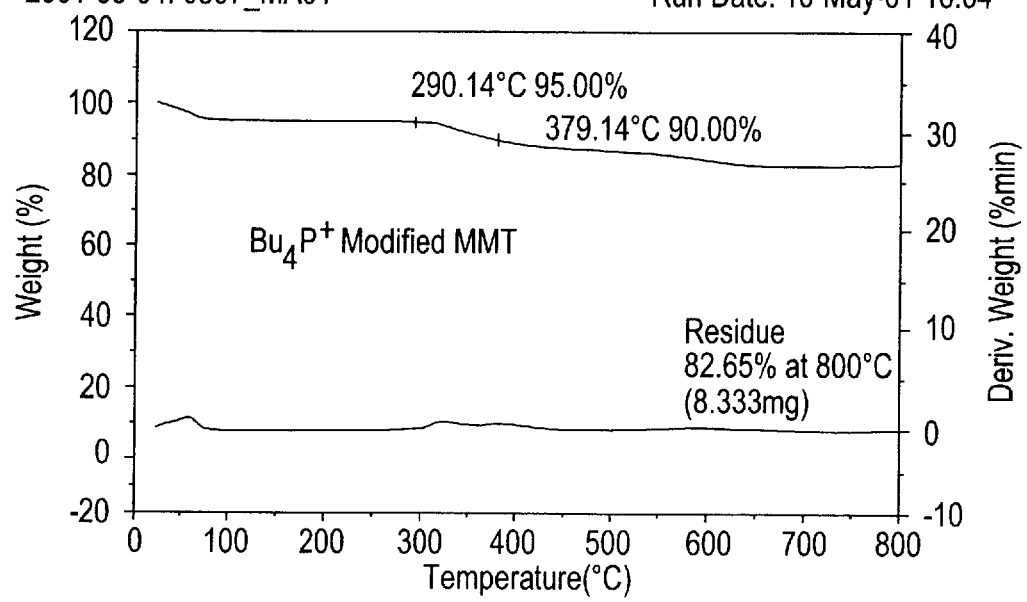
FIGS. 2 (A and B) shows thermogravimetric analysis traces for two clays modified with alkylphosphonium and arylphosphonium cations, respectively.
FIG. 2C shows a thermogravimetric analysis trace for a montmorillonite clay modified with a mixture of an unsaturated cationic compound and a cationic diluent.
FIG. 2D shows a thermogravimetric analysis trace for the montmorillonite clay of FIG. 2C, after conversion of the unsaturated cationic compound to a cationic alkoxyamine, according to the invention.
Figure 2B:
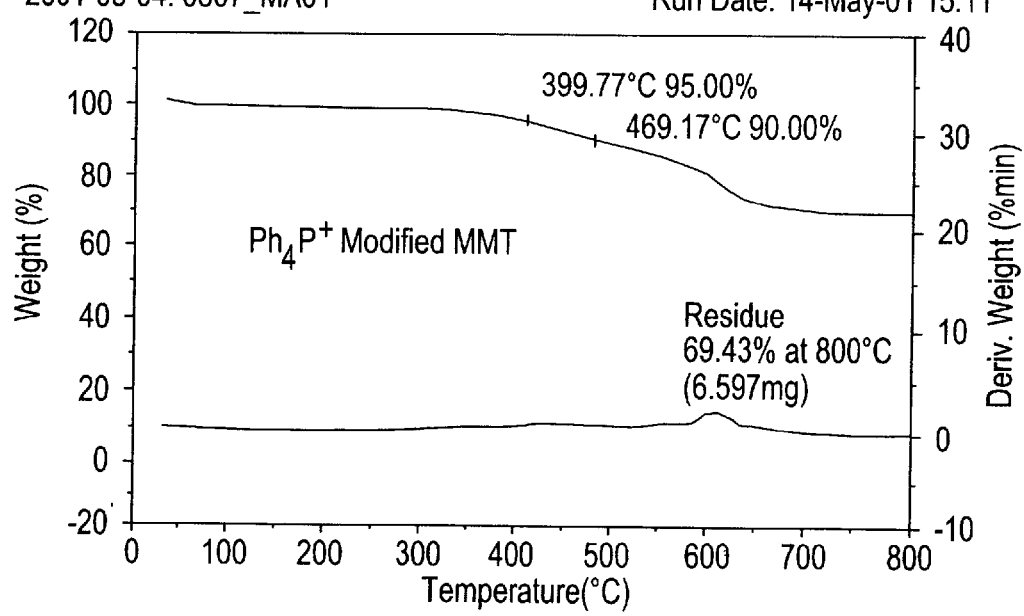
Figure 2C:
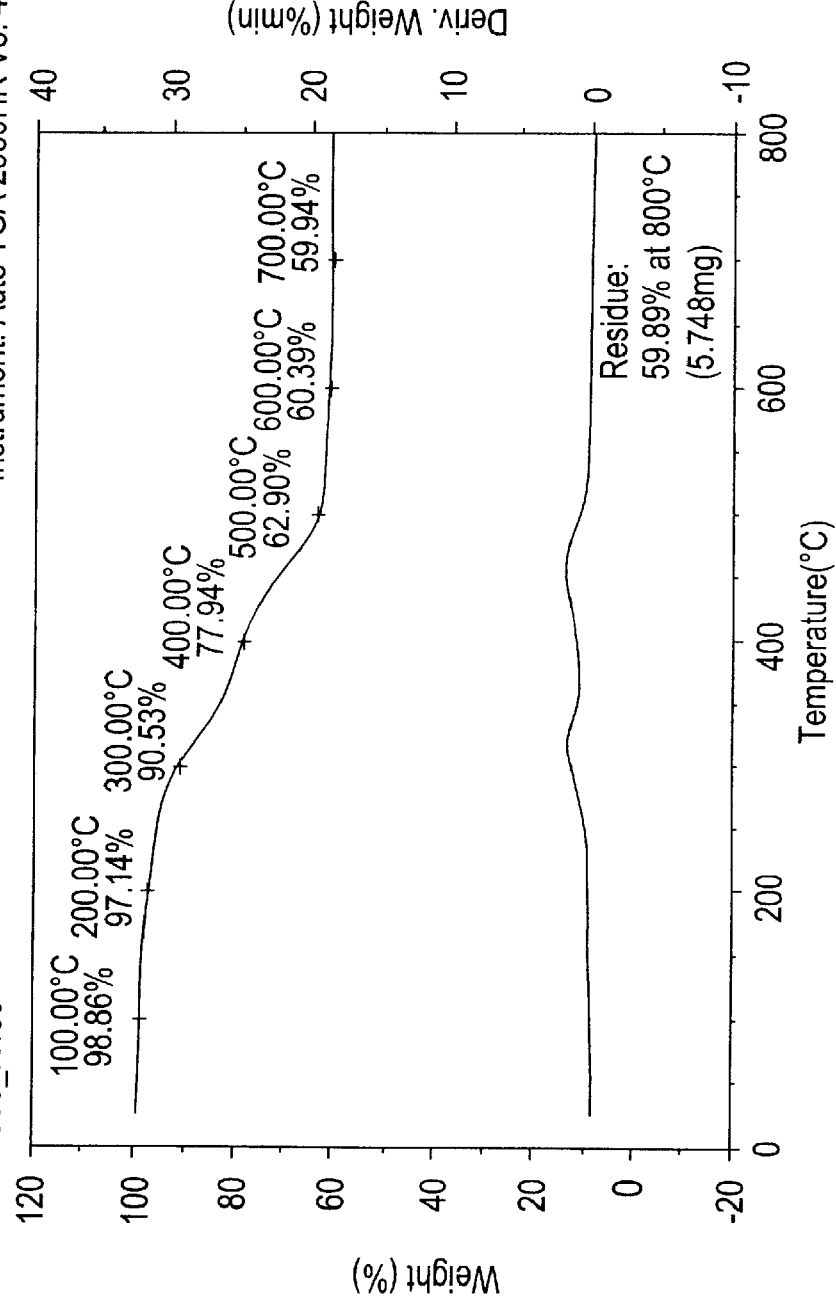
Figure 2D:
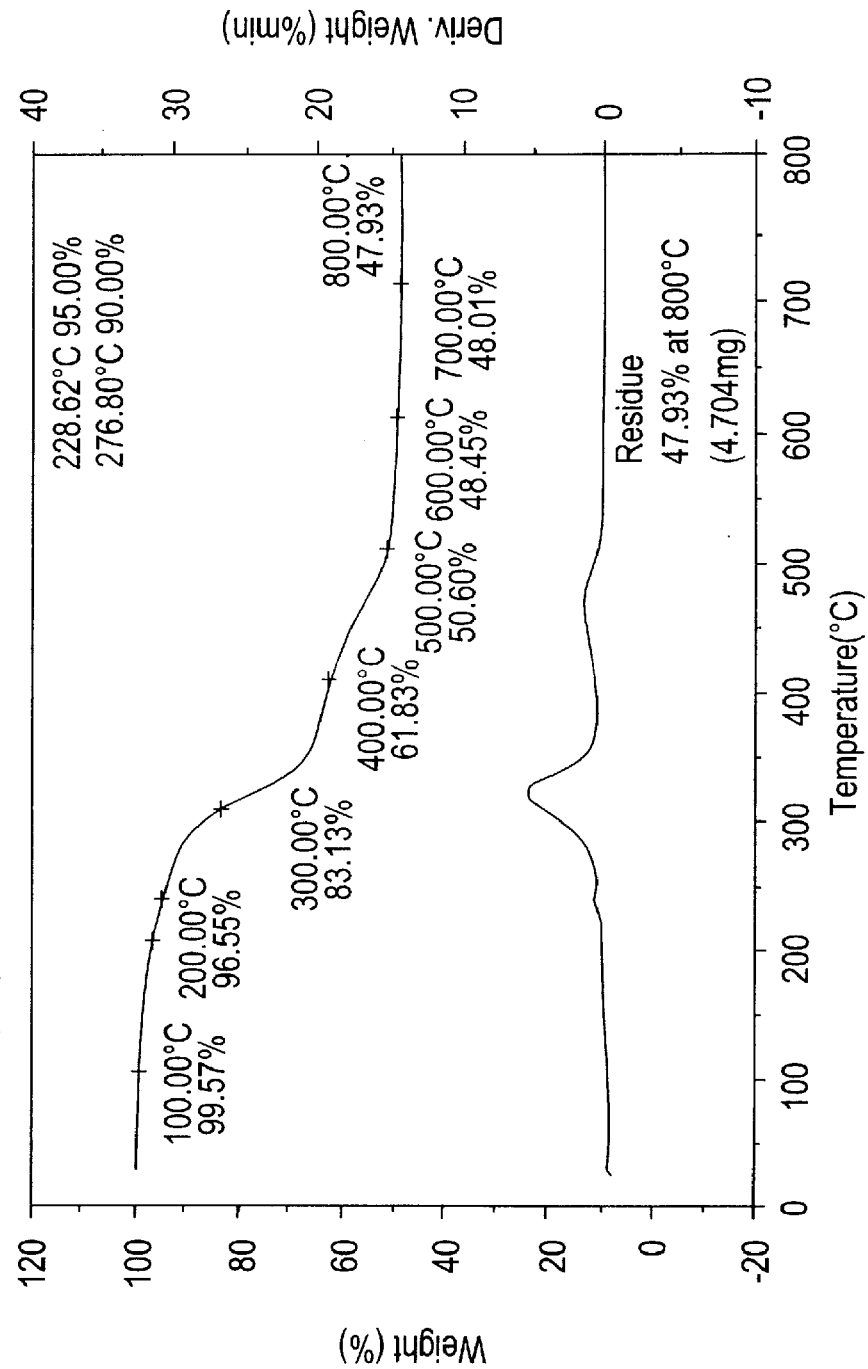

The results in Table 3 indicate significant intercalation of the mixture of the two phosphonium cations for the precursor, phosphonium-modified clay as evidenced by a significantly larger d-spacing. Also, it is seen that a significant portion of the modified clay is organic, indicating a high loading efficiency for the phosphonium cations as shown in FIG. 2C. Further d-spacing increase is observed upon reaction, or upon pre-activation of the precursor clay with the alkoxyamine initiator, with a corresponding further increase in weight percent organic component in the pre-activated phosphonium-modified clay as shown in FIG. 2D.

TABLE 4

Detailed Thermal Characterization of Fully Intercalated MMT Clay

| | | Wt % Organic | | | Wt % Inorganic | | |
|---|---|---|---|---|---|---|---|
| Sample[1] | Wt % $H_2O$[2] | Exp.[3] | Theory[4] | % Agree[5] | Exp.[3] | Theory[4] | % Agree[5] |
| 4 Precursor | 1.14 | 39.37 | 42.40 | 93.3 | 60.63 | 57.80 | 95.1 |
| 5 Preactivated | 0.43 | 51.86 | 50.43 | 97.2 | 48.14 | 49.57 | 97.1 |

Note:
[1]Samples 4-5 are taken from Table 3 above.
[2]Assigned as mass loss at temperatures T < 100° C. as shown in TGA FIGS. 2C-2D.
[3]Determined by TGA and then corrected for wt % $H_2O$ loss.
[4]Calculated for a 100% cation-exchanged Nanocor MMT PGV clay with a 50:50 mix of Phosphonium cations 1 + 2.
[5]Difference between respective Theory and Experimental values and is synonymous with % yield.

The results in Table 4 show a high degree of agreement between theory and experiment for both the precursor and pre-activated phosphonium-modified clays that are 100% cation-exchanged. Not surprisingly, the precursor clay (Sample 4) contains a slightly higher level of physio-adsorbed water, since it is the product isolated after cation exchange in an aqueous based suspension of the parent MMT clay as received from the supplier, Nanocor. The greater hydrocarbon content of the preactivated phosphonium modified MMT clay over the precursor monomer intercalated material may account for this lower level of physio-adsorbed water.

Example 3

Phosphonium Cation Syntheses

Synthesis of Stearyltriphenylphosphonium Bromide

Cation 1

In a one-liter 4-neck flask was placed 191.0 grams (728.8 mmol) of triphenylphosphine (TPP) and 166.7 grams (500.0 mmol) of stearyl bromide. A reflux condenser, a gas inlet, a rubber septum, a thermometer and its adapter, and an overhead mechanical stirrer were then attached. The reactor assembly was flushed with nitrogen for 15 minutes and then the flask was charged with 170 mL of anhydrous toluene. The solution was degassed for 5 minutes while gently stirring. The mixture was then heated to 110° C. for 72 hours, during which a white crystalline solid precipitated. The white crystalline solid was isolated, washed with diethyl ether (2×100 mL), and dried under vacuum overnight. $^1$H and $^{31}$P-NMR analyses of the purified material were consistent with the desired product. $^1$H-NMR (CDCl$_3$): δ=7.725-7.507 ppm (cm, 15), 3.467 ppm (m, 2H), 1.399 ppm (bdt, 2H), 1.021 ppm (s, 24H), 0.969 ppm (s, 4H), 0.634 ppm (bt, 3H). 13C-NMR (CDCl$_3$): 134.778 ppm (d, JC-P=13.5 Hz), 133.275 ppm (d, JC-P=39.9 Hz), 130.243 ppm (d, JC-P=50.7 Hz), 117.878 (d, JC-P=341.4 Hz), 31.532 ppm (s), 29.309-28.383 ppm (cm), 22.302 ppm (s), 13.783 ppm (s). $^{31}$P-NMR (CDCl$_3$): δ=24.323 ppm.

Synthesis of [4-(Bromomethyl)benzyl]triphenylphosphonium bromide

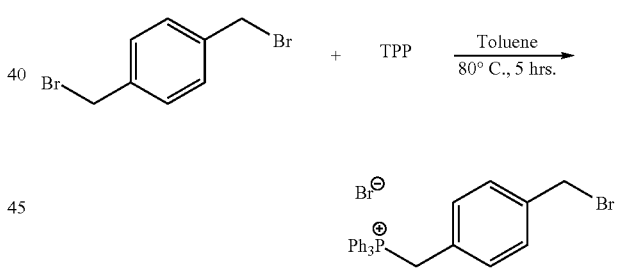

In a one-liter 4-neck flask was placed 124.7 grams (475.4 mmol) of TPP and 124.6 grams (472 mmol) of α,α'-dibromo-p-xylene. A reflux condenser, a gas inlet, a rubber septum, a thermometer and its adapter, and an overhead mechanical stirrer were then attached. The reactor assembly was flushed with nitrogen for 15 minutes and then the flask was charged with 600 mL of anhydrous toluene. The solution was degassed for 5 minutes while gently stirring. The mixture was then heated to 60-80° C. for 5 hours, during which a white crystalline solid precipitated. After 5 hours of heating, the solution was cooled to room temperature and suction filtered through a glass-fritted funnel. The white crystalline solid was isolated, washed with pentane, and dried under vacuum overnight. $^1$H and $^{31}$P-NMR analyses of the purified material were consistent with the desired product. $^1$H-NMR (CDCl$_3$): δ=7.865-7.515 ppm (cm, 15H), 7.095 ppm (bs, 4H), 5.429 ppm (d, 2H, JH-P=14.4 Hz), 4.343 ppm (d, 2H, JH-P=1.6 Hz). $^{31}$P-NMR (CDCl$_3$): δ=23.795 ppm.

Synthesis of [4-(methacrylmethyl)benzyl]triphenylphosphonium bromide

Cation 2

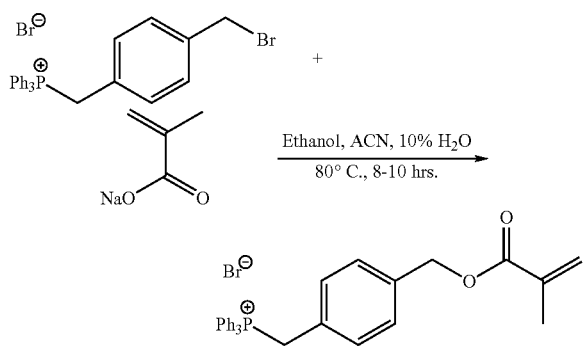

[4-(Bromomethyl)benzyl]triphenylphosphonium bromide (100 g, 190.0 mmol), sodium methacrylate (20.53 g, 190.0 mmol), and 4-(methoxy)phenol MEHQ (50 mg, 0.42 mmol) were placed in a 1-liter, 3-neck reactor. The charged reactor was fitted with a reflux condenser, an overhead mechanical stirrer and its adapter, and a thermometer and its adapter and a gas inlet, both on a Claisen adapter. The assembled reactor was flushed with a nitrogen gas purge for 15 minutes and then charged with ethanol (250 mL), acetonitrile (200 mL), and $H_2O$ (50 mL). The resulting mixture was stirred and the reactor heated to 80° C. for 8 hours. When the reaction was complete ($^{31}$P-NMR), the solvent was removed under reduced pressure by rotary evaporation. To the solid obtained was added ethanol, followed by evaporation under reduced pressure to azeotropically remove any residual water. The solid was dried for 24 hours under high vacuum and then suspended in dichloromethane in order to precipitate inorganic NaBr, which was removed by filtration. The $CH_2Cl_2$ solution was then dried over anhydrous $MgSO_4$, filtered to remove all insolubles, and then the solvent was removed under reduced pressure using a rotary evaporator to yield a white solid material. $^1$H and $^{31}$P-NMR analyses of the purified material were consistent with the desired product. $^1$H-NMR ($CDCl_3$): δ=7.720-7.452 ppm (cm, 15H), 7.064-6.990 ppm (cm, 4H), 6.025 ppm (bs, 1H), 5.505-5.494 ppm (t, 1H), 5.296 ppm (d, 2H, JH-P=14.4 Hz), 4.999 ppm (d, 2H, JH-P=1.8 Hz), 1.846 ppm (d, 3H, JH-P=0.9 Hz), 1.985 ppm (s, 3H). 13C-NMR ($CDCl_3$): δ=166.750 ppm (s, carbonyl), aromatic: 135.955 ppm (d, JC-P=144.0 Hz), 134.862 ppm (s), 134.474 (d, JC-P=39.9 Hz), 131.420 ppm (d, JC-P=21.3 Hz), 129.966 ppm (d, JC-P=50.7 Hz), 126.840 ppm (d, JC-P=32.1 Hz), 126.765 ppm (d, JC-P=557.4 Hz), 117.290 ppm (d, JC-P=341.4 Hz), alkyl: 65.322 ppm (s, —$CH_2$—), 30.094 ppm (d, —$CH_2$—, JC-P=183.9 Hz), 18.067 ppm (s, —$CH_3$). $^{31}$P-NMR: δ=23.331 ppm. Elemental analysis $C_{30}H_{28}PO_2Br$ (531.234) Calculated: Br, 15.04%. found: Br, 14.79%.

Example 4

Cation Exchange Procedure

75% Cation Exchange—Phosphonium Cation Intercalation—MMT Clay

The captioned product, having 75% of its inorganic cations exchanged with a 1:1 mole ratio of active to diluent phosphonium cations, was prepared as follows. A 3-liter, 4 neck flask was fitted with an overhead mechanical stirrer and its adapter, a thermometer and its adapter, and a 125 mL addition funnel, and a gas inlet. Then 50 grams of montmorillonite clay (PGV grade, 146 meq/100 g clay) was charged, followed by 470 mL of deionized $H_2O$. Rapid mechanical stirring ensured homogeneity while heating the suspension to 80° C. using a heating mantle. In a 250-mL round bottom flask, 14.21 g (26.75 mmol) of [4-(methacrylmethyl)benzyl]triphenylphosphonium bromide (531.42 g/mol) and 10.67 g (26.75 mmol) of stearyltriphenylphosphonium bromide (399.3 g/mol) were dissolved in 70 mL of deionized $H_2O$ and 70 mL of ethanol, followed by heating to complete dissolution. The phosphonium salt solution was then placed in the addition funnel and added slowly to the stirred clay suspension. (Note: Due to significant swelling of the clay upon addition of the salt solution, more water may in some cases be required to improve stirring.) After stirring for 3 hours at 80° C., the solution was left to cool down to room temperature for 1 hour. The resulting organically-modified clay suspension was then centrifuged (50000 rpm for 15 min). The water was decanted and the modified clay was placed in a 3 L Erlenmeyer flask with 400 mL of hot water and again stirred for 1 hour at 80° C. The mixture was again centrifuged (80000 rpm for 45 min), and the $H_2O$ again decanted. The residue was air dried overnight, ground to a granular powder, and then placed in a vacuum oven at 60° C. for 48 hours to give 54.0 grams of dried, organically-modified MMT clay. Analyses by TGA, XRD, and solid-state $^{31}$P NMR were consistent with the desired product.

100% Cation Exchange—Polymerizable Monomer and Diluent Cation—MMT Clay

The captioned product was prepared as described above, except that 19.39 g (36.5 mmol) of [4-(methacrylmethyl)benzyl]triphenylphosphonium bromide (531.42 g/mol) and 14.56 g (36.5 mmol) of stearyltriphenylphosphonium bromide (399.3 g/mol) were dissolved in 100 mL of deionized $H_2O$ and 100 mL of ethanol.

Example 5

Alkoxyamine Pre-Activation of Organically-Modified Clays

75% Exchanged MMT—iBA-DEPN Pre-Activation

In a 250-mL, 3-neck flask was placed 6 grams of phosphonium-modified MMT clay (75% cation-exchanged, 36.0 mmol Cation 2/100 g clay; 2.16 mmol [4-(methacrylmethyl)benzyl]triphenylphosphonium] and 2.16 mmol stearyltriphenylphosphonium cations) and 0.4 grams (1.05 mmol, 381.19 g/mol) of the iBA-DEPN alkoxyamine. A reflux condenser, gas inlet, thermometer and its adapter, and a Teflon coated stir bar were added and the sealed reactor was flushed with nitrogen gas for 15 minutes. The modified clay and iBA-DEPN alkoxyamine were then suspended in 100 mL of methyl acetate overnight followed by heating to 60° C. for 5 hours. After cooling to room temperature, the solvent was removed by a rotary evaporator. The crude pre-activated product was rinsed with 2×50 mL of diethyl ether, filtered through a glass-fritted funnel, and then dried under vacuum overnight. Solvent evaporation of the diethyl ether filtrate revealed no unreacted alkoxyamine. TGA analysis of the dried, isolated, phosphonium-modified clay showed loss of weight at higher temperatures in a manner consistent with the presence of a significant amount of cationic alkoxyamine. See Table 4 for a detailed analysis of weight loss.

100% Exchanged MMT—iBA-DEPN Pre-Activation

In a 500-mL, 3-neck flask was placed 40 grams of phosphonium-modified MMT clay (100% cation-exchanged, 43.5 mmol Cation 2/100 g clay; 17.4 mmol [4-(methacrylmethyl)benzyl]triphenylphosphonium] and 17.4 mmol stearyltriphenylphosphonium cations). TGA analysis of the phosphonium-modified clay is shown in FIG. 2C. The modified clay and 14.63 grams (38.4 mmol, 381.19 g/mol) of iBA-DEPN alkoxyamine was then suspended in 250 mL of methyl acetate overnight, followed by heating to 60° C. for 5 hours. The mixture was cooled to room temperature, and the modified clay purified and isolated as above. TGA analysis of the dried modified clay, shown in trace D of FIG. 2, supports intercalated monomer pre-activation, as indicated by the large amount of mass (about 50% of the total, vs. about 40% in trace C) lost upon heating to 800° C. Trace D also shows a new peak at about 300° C., consistent with adduction of the iBA-DEPN onto the anchored 4-(methacrylmethyl)benzyl]triphenylphosphonium group to form an anchored cationic alkoxyamine.

Example 6

Nanocomposites containing modified clay and polymethyl methacrylate (PMMA) according to the invention were prepared and evaluated as follows, with the results shown below in Table 5.

The indicated amount of phosphonium-modified clay was swollen in methyl methacrylate (MMA) containing a chain transfer agent, a standard peroxide free radical initiator, and a high MW PMMA viscosity enhancer. The clay had been treated with a 1:1 mole ratio mixture of the unsaturated phosphonium salt [4-(methacrylmethyl)benzyl]triphenylphosphonium bromide (unsaturated Cation 2) and stearyltriphenylphosphonium (diluent Cation 1). The wt % loadings of clay in the reaction mixtures are shown in Table 5. Unless otherwise noted below, polymerization was effected by heating the suspension containing MMA and preactivated clay sequentially to 40° C. with a 16-hour hold, to 60° C. with a 16-hour hold, to 80° C. with a 2-hour hold, and to 125° C. with a 3-hour hold.

Example 7

Bulk Polymerization Using Non-Nitroxide Radical Initiator

A 40-ounce jar was charged with methyl methacrylate (73.1 g, 730 mmol), the phosphonium-modified clay shown as sample 2 in Table 3 (1.88 g), and 14 g of high molecular weight PMMA in pellet form (V920, available from Arkema Inc. of Philadelphia, Pa.). The jar containing the suspension was then mechanically agitated overnight to effect total dispersion of the phosphonium-modified clay and dissolution of the PMMA in the monomer. The jar was shaken, a chain transfer agent and a suitable free radical initiator were added, and the jar was again shaken for an additional 30 minutes. The resulting mixture was then placed in a suitable reaction vessel and heated using a temperature range between 60° C. and 120° C. in order to achieve conversion of more than 90% of the MMA to PMMA. The product (sample 2 of Table 5) showed increased $T_g$ and increased modulus compared with sample 1, neat PMMA.

Example 8

Bulk Polymerization Using Alkoxyamine Pre-Activated Clay

Procedures for bulk polymerization using initiators such as iBA-DEPN were similar to the non-nitroxide radical initiated reactions described in relation to Example 7, except that the alkoxyamine was added in the form of its adduct by suspending a pre-activated MMT-PGV clay such as described in Example 5 in methyl methacrylate. As detailed below in Table 5, sample 4 used iBA-DEPN modified clay without a standard radical initiator, while sample 6 used both. The jar containing the suspension was then mechanically agitated overnight to effect total dispersion of the phosphonium-modified clay and dissolution of the PMMA in the monomer. After shaking, a chain transfer agent was added followed by shaking for an additional 30 minutes. The temperature in the heating oven was maintained at 40° C. for 16-18 hours. The viscous or solid product, containing some unreacted methyl methacrylate, was suspended in 100-150 mL toluene and then added dropwise to rapidly stirring hexanes (900 mL). The precipitated phosphonium-modified clay/PMMA nanocomposite was then collected on a glass fritted funnel via vacuum filtration, rinsed with 100 mL of hexanes, and then placed under high vacuum for 24 hrs. to dry further.

After polymerization, each of the samples was cryoground to a granular solid and then melt processed at 260° C. for 10 min. in a twin screw melt mixer at 100 rpm under an $N_2$ atmosphere. The resulting nanocomposite materials containing Montmorillonite clay and PMMA were evaluated as follows. The peak decomposition temperature ($T_{pd}$) was determined by TGA analysis, using 10° C./min. ramping from ambient to 800° C. under $N_2$. Differential Scanning Calorimetry (DSC) runs were cycled from −50 to 150° C., with a heating rate of 20° C./min and a cooling rate of 10° C./min. Dynamic mechanical analysis testing was performed at a frequency of 1 Hz, a heating rate of 5° C. per minute, and at strain values ranging from 0.03 to 0.3%. All testing was conducted under a nitrogen atmosphere, with the elastic modulus G' (MPa) results determined at 25° C. Results of these analyses are shown in Table 5.

TABLE 5

Thermal Characterization of Phosphonium-Modified Clay/PMMA Nanocomposites Made By Bulk Polymerization (Unoptimized)

| Sample | Wt % Clay | Cations | Mode of Initiation | PMMA Yield | $T_{pd}$ ° C. | $T_g$ ° C. | G' (MPa) 25° C. |
|---|---|---|---|---|---|---|---|
| Standard Free Radical | | | | | | | |
| 1 | None | None | None: purchased PMMA was used | NA | 375 | 106.0 | 1550 |
| 2[1] | 5.0-MMT PGV | 1 + 2 | Standard Radical, no alkoxyamine | 90% | 376 | 114.8 | 1730 |

TABLE 5-continued

Thermal Characterization of Phosphonium-Modified Clay/PMMA Nanocomposites Made By Bulk Polymerization (Unoptimized)

| Sample | Wt % Clay | Cations | Mode of Initiation | PMMA Yield | $T_{pd}$ °C. | $T_g$ °C. | G' (MPa) 25° C. |
|---|---|---|---|---|---|---|---|
| Living Free Radical | | | | | | | |
| 3 | None | None | iBA-DEPN | 95% | 285, 380[3] | 110.3 | 1540 |
| 4[1] | 5.0-MMT PGV | 1 + 2 | Pre-Activated[4,5] | 60% | 379.7 | 109.3 | 1780 |
| 5[1] | 5.0-MMT PGV | 1 + 2 | Post-Activated[5,6] | 56% | 286, 381 | 110.2 | 1730 |
| 6[2] | 5.0-MMT-PGV | 1 + 2 | Combination[4,7] | 95% | 380.8 | 108.3 | 1680 |

Note:
[1]Clay was 75% cation-exchanged with the indicated phosphonium cations. Polymerization temperature conditions as in Example 6, but without 40° C. hold.
[2]Clay was 100% cation-exchanged with the indicated phosphonium cations.
[3]Bimodal TGA trace is consistent with lower MW PMMA as shown in bimodal GPC trace in tetrahydrofuran at 25° C.
[4]Clay containing diluent 1 and unsaturated 2 phosphonium cations was pre-reacted with iBA-DEPN and purified before being swelled with MMA and bulk polymerized (no solvent).
[5]No standard radical initiator was added. However, a chain transfer agent was added.
[6]iBA-DEPN was added simultaneously with the chain transfer agent and the high MW PMMA.
[7]Standard radical initiator, chain transfer agent, and 10 wt % high MW PMMA were added to MMA-swelled, pre-activated clay.

The results shown in Table 5 demonstrate that high yields of monomer conversion to form nanocomposites were achieved according to the invention, and that the thermal and mechanical properties were enhanced. The glass transition temperature ($T_g$) of PMMA is reported in the polymer literature to be 105° C., and thus these results indicate that enhancement of thermal properties was obtained. Higher G' values indicate higher molecular weight polymer, higher monomer conversion, and/or stronger bonding of polymer to the clay.

Although the invention is illustrated and described herein with reference to specific embodiments, it is not intended that the subjoined claims be limited to the details shown. Rather, it is expected that various modifications may be made in these details by those skilled in the art, which modifications may still be within the spirit and scope of the claimed subject matter and it is intended that these claims be construed accordingly.

What is claimed:

1. A method for making a modified clay, the method comprising:

a) contacting a clay with an aqueous solution comprising a compound according to formula III:

Y—W—Z—C($R_1$)=$CH_2$     III; and thereafter b) contacting the clay with an organic solvent solution comprising an alkoxyamine according to formula IV:

$R_2$—O—N$R_3R_4$     IV;

wherein Y is a heterocyclic quaternary ammonium moiety, $^+NX_1X_2X_3$, or $^+PX_1X_2X_3$ wherein $X_1$, $X_2$, and $X_3$ are each individually H or a C1-C20 group selected from the group consisting of alkyl, aryl, arylalkyl, alkylaryl, and any of these substituted with one or more of oxygen, nitrogen, sulfur, and phosphorus; W is a direct bond or a C1-C20 alkyl, aryl, arylalkyl, or alkylaryl spacer group; Z is selected from O, NH, O—CO, NH—CO, and phenylene; V is a vinylic monomer repeating unit; n is an integer from 0 to 100,000; $R_1$ and $R_2$ are as defined for $X_1$, $X_2$, and $X_3$; and $R_3$ and $R_4$ are each individually selected from C1-C10 alkyl or together form part of an unsubstituted or alkyl-substituted piperidine or pyrrolidine ring, provided that at least one of $R_3$ and $R_4$ is substituted alpha to N with PO(O$R_7$)$_2$, wherein each $R_7$ is individually selected from the group consisting of H, lower alkyl, aryl, arylalkyl, and alkylaryl.

2. The method of claim 1 wherein steps a) and b) are both performed in the absence of vinylic monomer.

3. The method of claim 1, wherein Y is $^+PX_1X_2X_3$.

4. The method of claim 1, wherein $X_1$, $X_2$, and $X_3$ are each individually C5-C10 aryl, C5-C10 heteroaryl, or lower alkyl substituted with C5-C10 aryl or C5-C10 heteroaryl.

5. The method of claim 1, wherein each of $X_1$, $X_2$, and $X_3$ is phenyl.

6. The method of claim 1, wherein W is $C_6H_4$—$CH_2$ and Z is O—CO.

7. The method of claim 1, wherein $R_1$ is methyl.

8. The method of claim 1, wherein $R_2$ is C($R_8$)$_2$—COOH or C($R_8$)$_2$—COO-(lower alkyl) wherein $R_8$ is H or a lower alkyl group.

9. The method of claim 1, wherein $R_3$ is tert-butyl and $R_4$ is CH(tert-butyl)PO(OEt)$_2$.

10. The method of claim 1, further comprising contacting the clay with a compound Y—$R_1$, wherein Y and $R_1$ are as defined in claim 1.

11. The method of claim 1, further comprising contacting the clay with a vinylic monomer.

12. The method of claim 11, wherein the vinylic monomer is styrene.

13. The method of claim 11, wherein the vinylic monomer is selected from the group consisting of acrylic acid, methacrylic acid, and esters and amides of these.

* * * * *